United States Patent
Huang et al.

(10) Patent No.: US 7,212,044 B2
(45) Date of Patent: May 1, 2007

(54) NETWORK TRANSMITTING UNIT WITH CORRECTION FUNCTION

(75) Inventors: Chih-Wen Huang, Dashe Township, Kaohsiung County (TW); Pao-Cheng Chiu, Sindian (TW)

(73) Assignee: Realtek Semiconductor Corp., Hsinchu (TW)

( * ) Notice: Subject to any disclaimer, the term of this patent is extended or adjusted under 35 U.S.C. 154(b) by 158 days.

(21) Appl. No.: 10/978,628

(22) Filed: Nov. 1, 2004

(65) Prior Publication Data

US 2005/0116745 A1 Jun. 2, 2005

(30) Foreign Application Priority Data

Dec. 1, 2003 (TW) .............................. 92133754 A (51) Int. Cl.
*H03B 1/00* (2006.01)
(52) U.S. Cl. .......................... 327/108; 326/30; 326/86
(58) Field of Classification Search ..................... None
See application file for complete search history.

(56) References Cited

U.S. PATENT DOCUMENTS

| | | | | | |
|---|---|---|---|---|---|
| 5,363,070 | A | * | 11/1994 | Arimoto | 333/100 |
| 5,457,427 | A | * | 10/1995 | Wong et al. | 330/302 |
| 2002/0070802 | A1 | * | 6/2002 | Kim | 330/133 |
| 2005/0059362 | A1 | * | 3/2005 | Kalajo et al. | 455/127.1 |
| 2005/0110529 | A1 | * | 5/2005 | Pradhan et al. | 327/108 |

* cited by examiner

*Primary Examiner*—Tuan T. Lam
(74) *Attorney, Agent, or Firm*—Thomas, Kayden, Horstemeyer & Risley (57) ABSTRACT

A signal transmitting apparatus being used in a network device includes a voltage-controlled current source for outputting a current signal according to an input digital signal; a line driver for outputting a voltage signal according to the current signal; at least one impedance-matching unit, which is coupled to the line driver, for impedance-matching at the output of the line driver; and a first correction unit, which is coupled to the voltage-controlled current source, for outputting a first correction signal to adjust the current signal outputted from the voltage-controlled current source.

19 Claims, 7 Drawing Sheets

NETWORK TRANSMITTING UNIT WITH CORRECTION FUNCTION

This application claims the benefit of Taiwan application Ser. No. 92133754, filed Dec. 1, 2003, the subject matter of which is incorporated herein by reference.

BACKGROUND OF THE INVENTION

1. Field of the Invention

The invention relates in general to a network device, and more particularly to a network device having a transmitting unit with correction function.

2. Description of the Related Art

Due to the advancing technology, the application areas of network have become broader and broader and thus the network has become an indispensable part in the daily life. In view of the growing demands (e.g., on-line multimedia application) on the network bandwidth, the speed of the network device has to be increased from the conventional 10/100 MHz to 1 GHz. Taking the high-speed Ethernet with the transmission speed of 1 GHz as an example, each connection port of the network device has four channels, and each channel has four I/O pads to be electrically connected to a primary side of a transformer and an impedance-matching resistor. The transformer is for filtering out DC components of the received or outputted signal. The secondary side of the transformer is coupled to twisted lines of the Ethernet in order to transmit/receive differential transmission signals. The network device simultaneously uses four channels when it performs the transmitting and receiving operations with another network device, and each channel performs the transmitting and receiving functions simultaneously.

Figure 1:
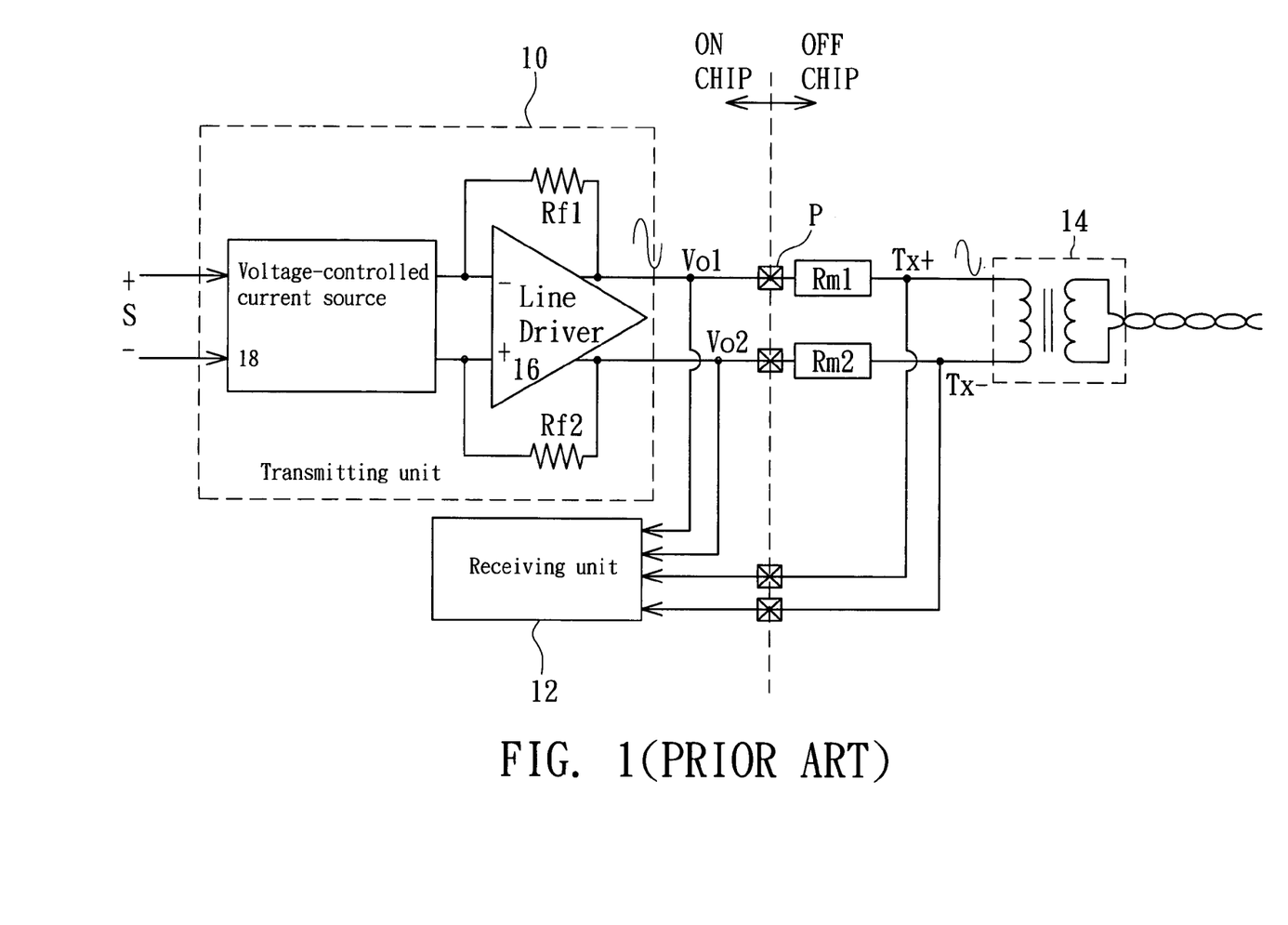
FIG. 1 is a schematic illustration showing a conventional voltage mode network device.

FIG. 1 is a schematic illustration showing a conventional voltage mode network device. The network device includes a transmitting unit 10 and a receiving unit 12. The transmitting unit 10 includes a voltage-controlled current source 18, a line driver 16, and feedback resistors Rf1 and Rf2. The voltage-controlled current source 18 is for receiving a digital differential signal S and outputting a corresponding differential current according to the digital differential signal S. The line driver 16 is a differential operational amplifier having a first input terminal, a second input terminal, a first output terminal and a second output terminal. The differential operational amplifier 16 amplifies the differential current outputted from the voltage-controlled current source 18 and outputs differential output signals Vo1 and Vo2 from the first output terminal and the second output terminal, respectively. The differential output signals Vo1 and Vo2 are fed back to the first input terminal and the second input terminal through the feedback resistors Rf1 and Rf2, respectively. Two impedance-matching resistors Rm1 and Rm2, which are respectively electrically connected to the output terminals of the line driver 16, provide for matching function with respect to the equivalent impedance ZL of the twisted lines. The equivalent impedance of the typical twisted lines is 100Ω, and the impedances of the impedance-matching resistors Rm1 and Rm2 are 50Ω. The line interface 14 is coupled to the impedance-matching resistors Rm1 and Rm2. The line interface may be a transformer 14 for filtering out DC components of the received or outputted signals. The I/O pads P are electrically connected to a primary side of the corresponding transformer 14, and a secondary side of the transformer 14 is coupled to the twisted lines. Because the impedance-matching resistor Rm1, the equivalent impedance ZL of the twisted lines, and the other impedance-matching resistor Rm2 form a voltage divider, the peak-to-peak value of the output signal of the line driver 16 is (Vo1−Vo2), the peak-to-peak value of each of the differential transmission signals Tx+ and Tx− is only one half that of (Vo1−Vo2), i.e., (½)*(Vo1−Vo2).

In addition, because the twisted lines simultaneously receive and transmit signals, the differential received signal is coupled to the output differential transmission signal at the input terminal, but is not coupled to the output signals Vo1 and Vo2 of the line driver 16. The receiving unit 12 may then subtract the coupled transmission differential signals Tx+ and Tx− from the received coupled differential signal according to the signals Vo1 and Vo2 outputted from the differential operational amplifier, and thus the differential received signal can be obtained.

However, owing to the reasons such as the process variation, the properties and values of various devices, such as resistors, current sources, or the like, within the IC cannot be precisely controlled. The conventional solution is to use precision resistors outside the IC as the impedance-matching resistors Rm1 and Rm2, and thus two additional I/O pads are needed to input the received differential signal to the receiving unit 12.

SUMMARY OF THE INVENTION

It is therefore one of the many objectives of the invention to provide a network device having a transmitting unit with correction function.

According to embodiments of the present invention, a signal transmitting apparatus being used in a network device is disclosed. The signal transmitting apparatus includes a voltage-controlled current source for outputting a current signal according to an input digital signal; a line driver for outputting a voltage signal according to the current signal; at least one impedance-matching unit, which is coupled to the line driver, for impedance-matching at the output of the line driver; and a first correction unit, which is coupled to the voltage-controlled current source, for outputting a first correction signal to adjust the current signal outputted from the voltage-controlled current source.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
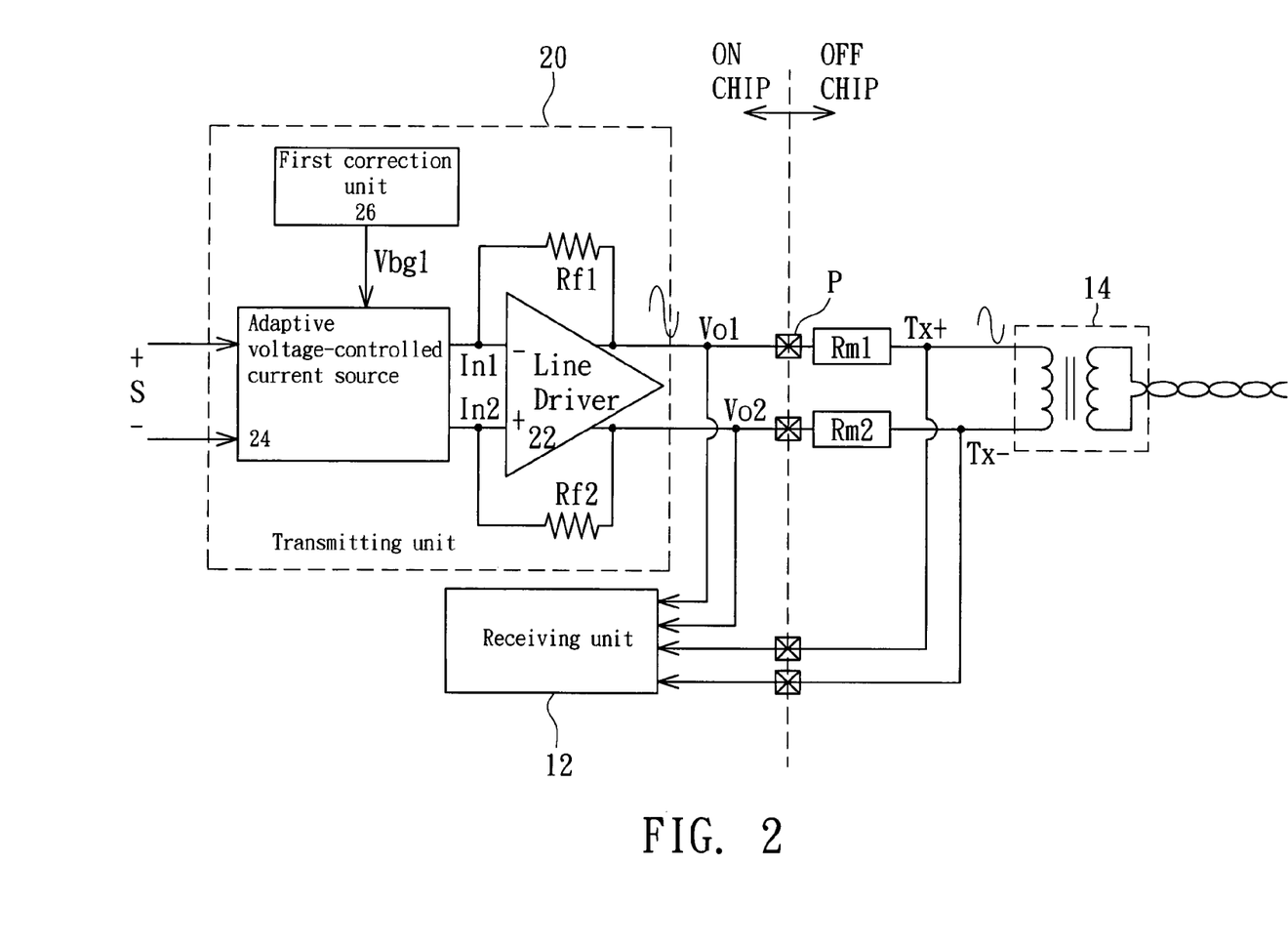
FIG. 2 is a schematic illustration showing a network device according to a first embodiment of the invention.

FIG. 2 is a schematic illustration showing a network device according to a first embodiment of the invention. Referring to FIG. 2, the network device includes a transmitting unit 20 and a transformer 14. If the impedance-matching resistors Rm1 and Rm2 are disposed outside the control chip, each channel needs four I/O pads P. The transmitting unit 20 includes an adaptive voltage-controlled current source 24, a first correction unit 26, a line driver 22, feedback resistors Rf1 and Rf2, and impedance-matching resistors Rm1 and Rm2. The first correction unit 26, which is coupled to the adaptive current source 24, is for outputting a correction signal Vbg1, which, in this embodiment, is a bandgap reference voltage, to the adaptive voltage-controlled current source 24. The adaptive voltage-controlled current source 24 outputs a first current signal In1 and a second current signal In2 according to a digital differential signal S, wherein the magnitudes of the first and second current signals may be adjusted according to the correction signal Vbg1. The line driver 22 is a differential operational amplifier having a first input terminal and a second input terminal, which are respectively coupled to the adaptive voltage-controlled current source 24. The differential operational amplifier is for outputting differential output signals Vo1 and Vo2 from the first and second output terminals, respectively, according to the first and second current signals, wherein the output signals Vo1 and Vo2 are reverse to each other. The differential output signals Vo1 and Vo2 are respectively fed back to the first and second input terminals through the feedback resistors Rf1 and Rf2, and outputted through the I/O pads P and the impedance-matching resistors Rm1 and Rm2. The equivalent impedance ZL of the twisted lines is 100Ω, so the impedance-matching resistors Rm1 and Rm2 may be respectively 50Ω.

Figure 3:
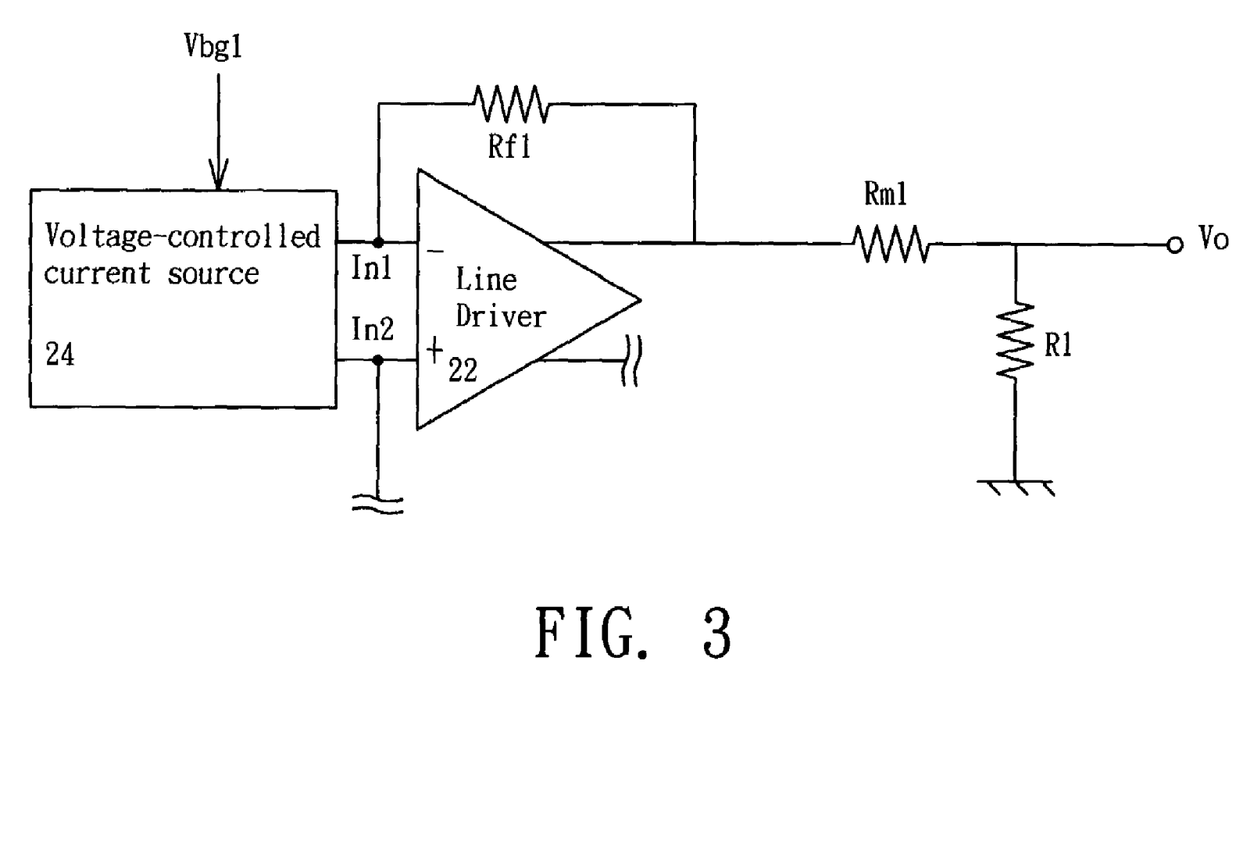
FIG. 3 is a schematic illustration showing a transmitting unit of FIG. 2.

FIG. 3 is a schematic illustration showing a single-ended view of the transmitting unit of FIG. 2. As shown in FIG. 3, the following equation may be obtained from the input-output relationship of the line driver 22:

$$Vo = (In1 \times Rf1) \times \frac{Rl}{Rm1 + Rl} \quad \text{(Equation 1)}$$
$$= \frac{Vbg1}{Rp2} \times Rf1 \times \frac{Rl}{Rm1 + Rl}$$
$$= \frac{Vbg1 \times Rl}{Rm1 + Rl} \times \frac{Rf1}{Rp2},$$

wherein Rm1 is the impedance of the impedance-matching resistor, Rl is the equivalent impedance of the twisted lines, Rf1 is the feedback resistance, and Rp2 is the output impedance of the adaptive voltage-controlled current source 24. Because Rf1 and Rp2 are manufactured under the same processing condition, $$\frac{Rf1}{Rp2}$$

may be regarded as a constant. Thus, the value of the output signal Vo is relevant to $$\frac{Vbg1 \times Rl}{Rm1 + Rl}$$

according to Equation 1. In this specification, it is set that:

$$\frac{Vbg1 \times Rl}{Rm1 + Rl} = Vbg2, \quad \text{(Equation 2)}$$

wherein Vbg2 is another bandgap reference voltage.

However, owing to the factors such as the process variations, the device property of the impedance-matching resistor Rm1 and that of the equivalent impedance Rl are different. The embodiment of the invention eliminates the effect caused by the device property difference by keeping Vbg2 constant and adjusting the correction signal Vbg1 such that the value of the output signal Vo is free from being influenced by the device property variation.

Equation 2 may be simplified into:

$$Vbg1 - Vbg2 = \frac{Vbg2}{Rl} \times Rm1. \quad \text{(Equation 3)}$$

When Equation 3 is satisfied, the Vo value is free from being influenced by the process and environment variations.

Figure 4:
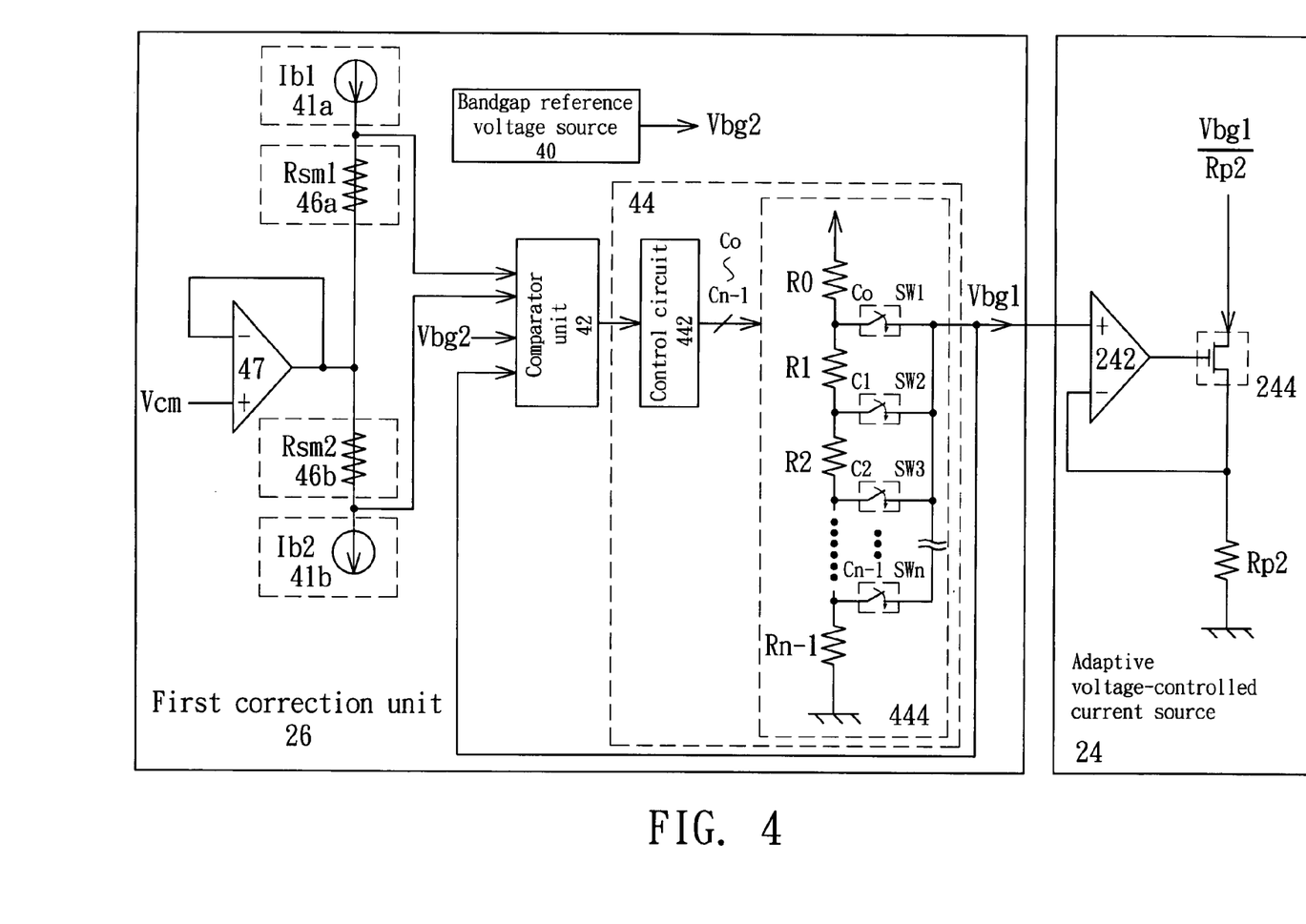
FIG. 4 is a circuit block diagram showing an adaptive voltage controlled voltage source of a first correction unit of FIG. 2 according to the first embodiment of the invention.

FIG. 4 is a circuit block diagram showing an adaptive voltage controlled voltage source 24 of the first correction unit 26 of FIG. 2 according to the first embodiment of the invention. Referring to FIG. 4, the first correction unit 26 includes a bandgap reference voltage source 40 for generating a bandgap reference voltage Vbg2. A first current source 41a and a second current source 41b respectively output reference currents Ib1 and Ib2 having the magnitude of (Vbg2/Rsl)/2 according to bandgap reference voltage Vbg2. Here in this embodiment, Rsl is an external precision resistor, and thus can be set to an equivalent value of the actual output impedance Rl. The first simulated impedance-matching resistor Rsm1 and the second simulated impedance-matching resistor Rsm2 are respectively cascoded with the first current source 41a and the second current source 41b. The impedance values of the simulated impedance-matching resistors Rsm1 and Rsm2 follow the actual impedance-matching resistor Rm. That is, the magnitudes of Rsm1 and Rsm2 may be correspondingly adjusted according to the magnitude of the actual impedance-matching resistor Rm. Based on the output common mode voltage Vcm outputted from the amplifier 47, the first and second simulated impedance-matching resistors Rsm1 and Rsm2 output differential matching voltage Vbg2*Rsm/Rsl, the magnitude of which is substantially the same as the theoretical value of Vbg2*Rm1/Rl, according to the reference current Vbg2/Rsl. The comparator unit 42 receives the matching voltage Vbg2*Rsm/Rsl, the correction signal Vbg1, and the bandgap reference voltage Vbg2, compares the difference (Vbg1−Vbg2) between the correction signal Vbg1 and the bandgap reference voltage Vbg2 with the magnitude of the matching voltage (Vbg2*Rsm/Rsl), and outputs a comparison result. The adaptive voltage unit 44 is coupled to the comparator unit 42 and adjusts the correction signal Vbg1 according to the comparison result. The adaptive voltage unit 44 may be implemented in a digital or analog manner. In the embodiment of FIG. 4, the adaptive voltage unit 44 includes a control circuit 442, which is coupled to the comparator unit 42 and outputs multiple control signals C0 to Cn−1 according to the comparison result. The impedance-adaptive unit 444 includes a resistor string having a plurality of resistors R0, R1, . . . , Rn connected in series, and a plurality of switches SW1,SW2, . . . , SWn for controlling the ON/OFF state of the corresponding switch according to the control signals C0 to Cn−1 outputted from the control circuit. Thus, the magnitude of the correction signal Vbg1 may be adjusted according to the principle of voltage division.

In this embodiment, because the equivalent impedance Rsl of the first and second current sources and the first and second simulated impedance-matching resistors Rsm1 and Rsm2 of the first correction unit 26 may be respectively adjusted according to the actual output impedance Rl and the impedance-matching resistor Rm, the magnitude of the correction signal Vbg1 outputted by the first correction unit 26 corresponds to the effects caused by the impedance-matching resistor Rm1 and the property difference of the device for outputting the equivalent impedance Rl.

In this embodiment, the adaptive voltage-controlled current source 24 includes an amplifier 242, an output impedance Rp2 and a MOS transistor 244, as shown in FIG. 4. The adaptive voltage-controlled current source 24 outputs a corresponding current signal Vbg1/Rp2 as an input current of the line driver 22 under the control of the correction signal Vbg1.

Figure 5:
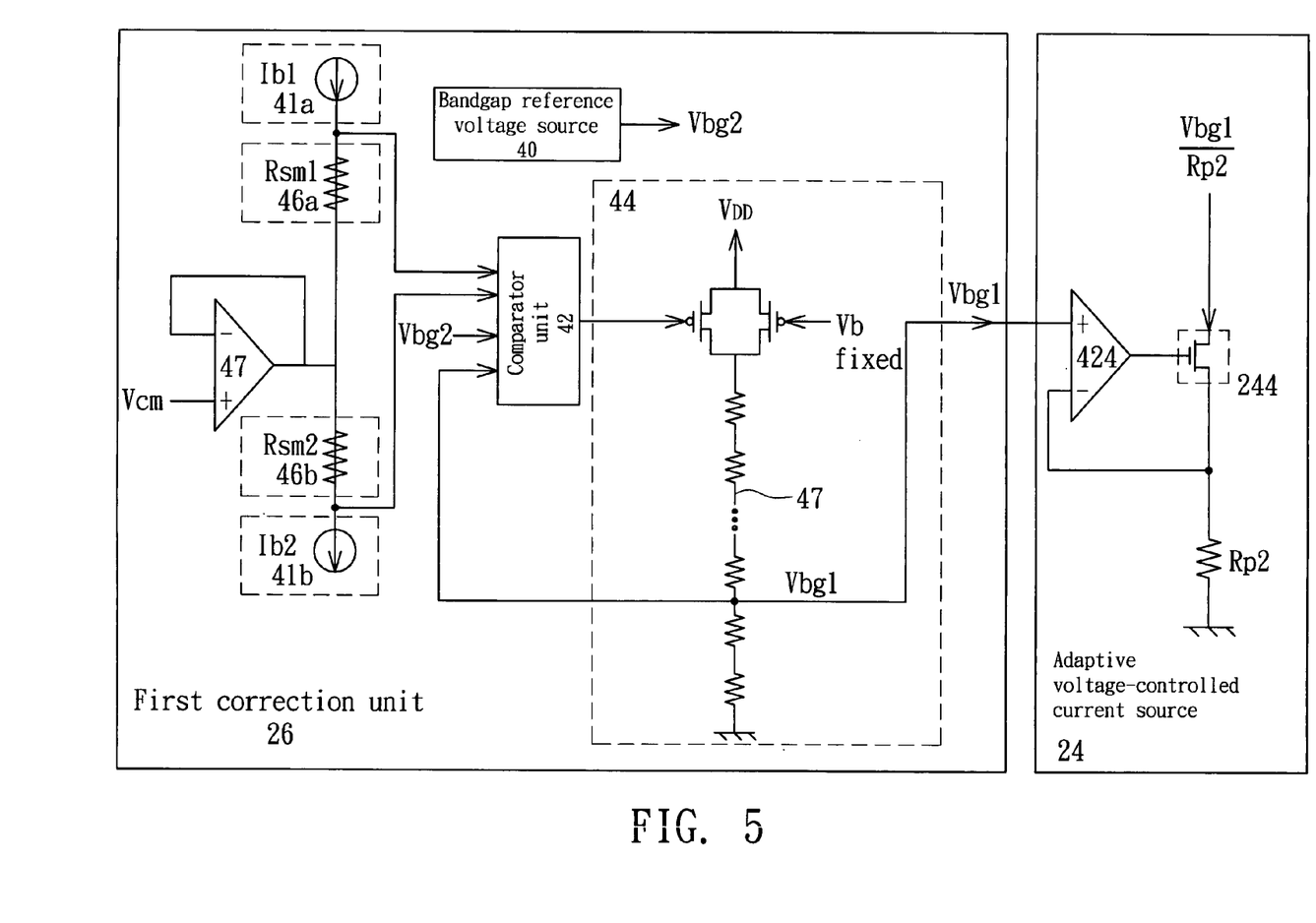
FIG. 5 is a circuit block diagram showing a first correction unit of FIG. 2 according to a second embodiment of the invention.

FIG. 5 is a circuit block diagram showing a first correction unit of FIG. 2 according to a second embodiment of the invention. In he embodiment of FIG. 5, the adaptive voltage unit 44 is implemented in an analog manner and includes a resistor string 47 composed of a plurality of resistors connected in parallel and a transistor pair 48 coupled to the resistor string 47. The transistor pair 48 is coupled to an operation voltage VDD. A gate of one of the transistors receives a constant bias Vb, and a gate of another transistor receives the comparison result outputted from the comparator unit 42. The drain of the resistor string 47 is coupled to the drain of the transistor pair 48, and a connection point of the resistor string 47 is for outputting the correction signal Vbg1. The correction voltage Vbg1 is outputted from a contact point of the resistor string 47. The comparison result outputted by the comparator unit 42 serves as a gate voltage of one of the transistors of the transistor pair 48 so as to change the current flowing through the resistors connected in series and thus to adjust the correction voltage Vbg1 outputted therefrom.

Figure 6:
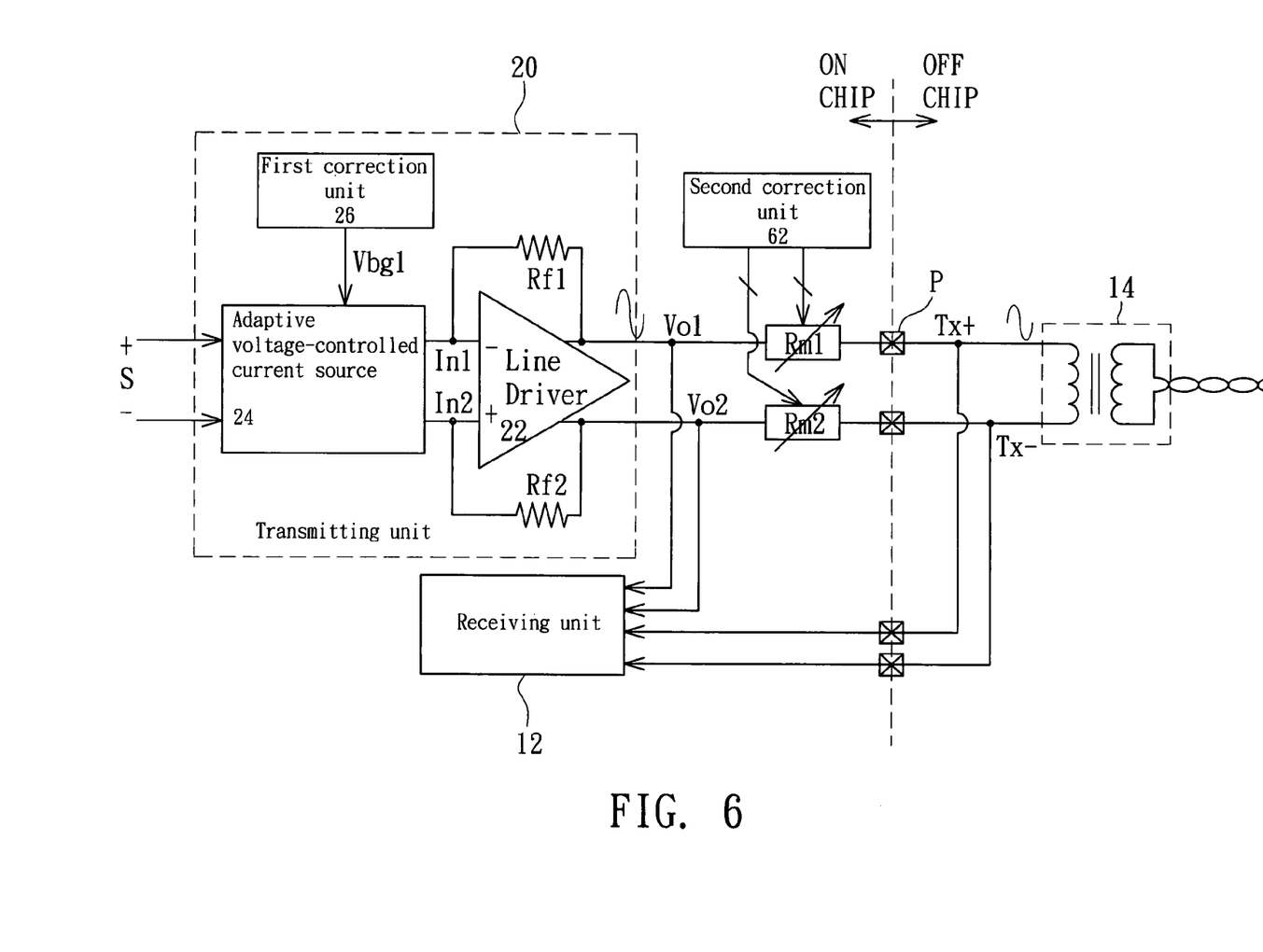
FIG. 6 is a schematic illustration showing a network device according to a third embodiment of the invention.
Figure 7:
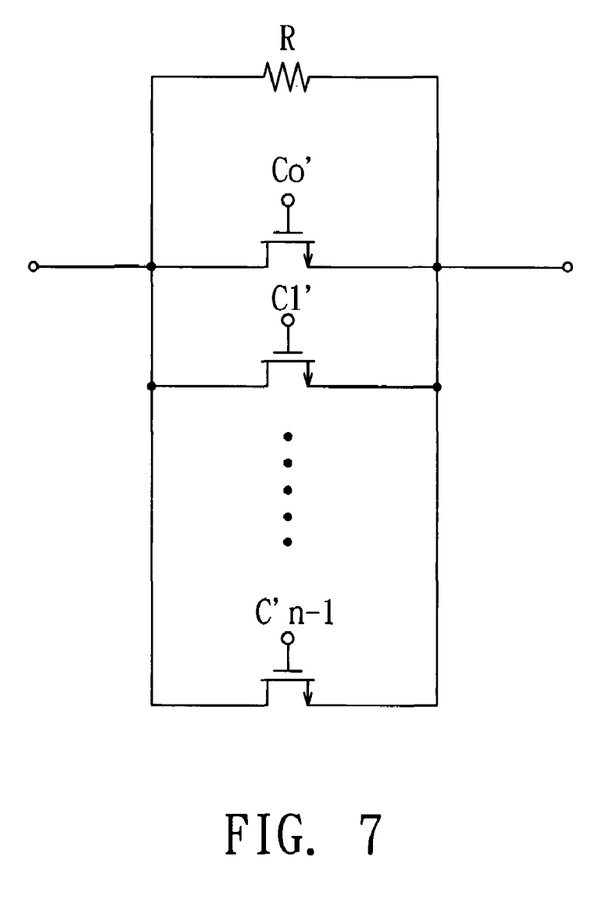
FIG. 7 is a schematic illustration showing an adaptive impedance matching device.

FIG. 6 is a schematic illustration showing a network device according to a third embodiment of the invention. Referring to the embodiment of FIG. 6, in addition to the first correction unit 26 and the adaptive voltage-controlled current source 24, the impedance-matching resistors Rm1 and Rm2 are also set inside the IC chip. In this embodiment, the preferred implementations of the impedance-matching resistors Rm1 and Rm2 are the adaptive impedance-matching device as shown in FIG. 7, wherein the transistors are respectively controlled to be turned on or off by a plurality of control signals C0' to Cn−1' provided by the second correction unit 62. If the turn-on resistance of each transistor is assumed to be Ron, and the number of transistor being turned on is K, the adaptive impedance-matching device in FIG. 7 renders a resistance of Req=R||(Ron/K). The configuration and operation of the adaptive impedance-matching device shown in FIG. 7 are well known to those of ordinary skill in the art, and therefore are not detailed herein. Consequently, instead of four I/O pads as in the conventional art, each channel in this invention only needs two I/O pads P. In addition, a second correction unit 62 for respectively outputting a control signal to the impedance-matching resistors Rm1 and Rm2 is further provided inside the IC chip in this embodiment so as to adjust the impedance of the impedance-matching resistor. The working principle and embodiment of the second correction unit 62 are similar to those of the first correction unit, and one of ordinary skill in the art may easily implement the second correction unit 62 according to the corresponding description mentioned above. As a result, detailed descriptions thereof will be omitted.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal transmitting apparatus being used in a network device, the signal transmitting apparatus comprising:
  a voltage-controlled current source for outputting a current signal according to an input digital signal;
  a line driver for outputting a voltage signal according to the current signal;
  at least one impedance-matching unit, which is coupled to the line driver, for impedance-matching at the output of the line driver; and
  a first correction unit, which is coupled to the voltage-controlled current source, for outputting a first correction signal to adjust the current signal outputted from the voltage-controlled current source.

2. The transmitting apparatus according to claim 1, wherein the first correction unit comprises:
  a bandgap reference voltage source for outputting a bandgap reference voltage;
  a simulated impedance-matching resistor unit, which is for outputting a matching signal according to the bandgap reference voltage, and comprises a simulated impedance-matching resistor having an impedance substantially the same as that of the impedance-matching unit;
  a comparator unit for outputting a comparison result according to the matching signal, the first correction signal and the bandgap reference voltage; and
  an adaptive voltage unit for outputting the first correction signal according to the comparison result.

3. The transmitting apparatus according to claim 2, wherein the adaptive voltage unit comprises:
  a control unit for outputting a control signal according to the comparison result; and
  an impedance-adaptive unit for outputting the first correction signal according to the control signal.

4. The transmitting apparatus according to claim 3, wherein the impedance-adaptive unit comprises:
  a plurality of resistors connected in series to form a plurality of contact points;
  a plurality of switches each comprising a first end and a second end, wherein the first ends respectively correspond to and coupled to the contact points, the second ends are coupled together to form a voltage-divided output terminal, and the control signal controls ON/OFF states of the switches so as to adjust a magnitude of the first correction signal.

5. The transmitting apparatus according to claim 2, wherein an impedance of the simulated impedance-matching resistor is adjusted according to the impedance-matching unit.

6. The transmitting apparatus according to claim 1, wherein the first correction unit comprises:
   a bandgap reference voltage source for outputting a bandgap reference voltage;
   a simulated impedance-matching resistor unit for outputting a matching signal according to the bandgap reference voltage, the simulated impedance-matching resistor unit comprising a simulated impedance-matching resistor having an impedance substantially the same as that of the impedance-matching unit;
   a comparator unit for outputting a comparison result according to the matching signal, the first correction signal and the bandgap reference voltage;
   a transistor pair, which is coupled to a voltage source, for receiving the comparison result and a constant voltage signal; and
   a resistor string comprising a plurality of resistors connected in series and a plurality of nodes, wherein the resistor string is coupled to the transistor pair, and one of the nodes is for outputting the first correction signal.

7. The transmitting apparatus according to claim 1, wherein the voltage-controlled current source comprises:
   an amplifier having a first input terminal, a second input terminal, and an output terminal, wherein the first input terminal is for receiving the first correction signal;
   a MOS transistor having a gate coupled to the output terminal and a source coupled to the second input terminal; and
   an output impedance coupled to the second input terminal.

8. The transmitting apparatus according to claim 1, further comprising a second correction unit for adjusting an impedance of the at least one impedance-matching unit.

9. The transmitting apparatus according to claim 8, wherein the at least one impedance-matching unit is disposed in an IC chip.

10. The transmitting apparatus according to claim 1, wherein the at least one impedance-matching unit comprises a resistor and at least one transistor.

11. The transmitting apparatus according to claim 1, wherein the first correction signal adjusts the current signal outputted from the voltage-controlled current source in a way to render an output signal of the signal transmitting apparatus substantially irrelevant of the at least one impedance-matching unit and the equivalent impedance of the network device.

12. The transmitting apparatus according to claim 1, wherein the first correction signal generated by the first correction unit is a bandgap reference voltage.

13. A signal transmitting apparatus being used in a network device, the signal transmitting apparatus comprising:
   a voltage-controlled current source for outputting a current signal according to an input voltage signal;
   a line driver for driving a transmitting medium according to the current signal;
   at least one impedance-matching unit, which is coupled to the line driver, for impedance-matching at the output of the line driver; and
   a first correction unit, which is coupled to the voltage-controlled current source, for outputting a first correction signal to adjust the current signal outputted from the voltage-controlled current source.

14. The transmitting apparatus according to claim 13, wherein the first correction unit comprises:
   a bandgap reference voltage source for outputting a bandgap reference voltage;
   a simulated impedance-matching resistor unit, which is for outputting a matching signal according to the bandgap reference voltage, and comprises a simulated impedance-matching resistor having an impedance substantially the same as that of the impedance-matching unit;
   a comparator unit for outputting a comparison result according to the matching signal, the first correction signal and the bandgap reference voltage; and
   an adaptive voltage unit for outputting the first correction signal according to the comparison result.

15. The transmitting apparatus according to claim 14, wherein the adaptive voltage unit comprises:
   a control unit for outputting a control signal according to the comparison result; and
   an impedance-adaptive unit for outputting the first correction signal according to the control signal.

16. The transmitting apparatus according to claim 13, wherein the first correction unit comprises:
   a bandgap reference voltage source for outputting a bandgap reference voltage;
   a simulated impedance-matching resistor unit for outputting a matching signal according to the bandgap reference voltage, the simulated impedance-matching resistor unit comprising a simulated impedance-matching resistor having an impedance substantially the same as that of the impedance-matching unit;
   a comparator unit for outputting a comparison result according to the matching signal, the first correction signal and the bandgap reference voltage;
   a transistor pair, which is coupled to a voltage source, for receiving the comparison result and a constant voltage signal; and
   a resistor string comprising a plurality of resistors connected in series and a plurality of nodes, wherein the resistor string is coupled to the transistor pair, and one of the nodes is for outputting the first correction signal.

17. A signal transmitting method being used for network communications, the method comprising:
   generating a current signal according to an input voltage signal;
   driving a transmitting medium according to the current signal;
   providing an impedance-matching unit for impedance-matching of the transmitting medium; and
   generating a first correction signal for adjusting the current signal;
   wherein, generating the first correction signal further comprises:
   generating a bandgap reference voltage;

generating a matching signal according to the bandgap reference voltage;

generating a comparison result according to the matching signal, the first correction signal and the bandgap reference voltage; and outputting the first correction signal according to the comparison result.

18. The signal transmitting method according to claim 17, wherein said step of outputting the first correction signal further comprises:

generating a control signal according to the comparison result; and outputting the first correction signal according to the control signal.

19. The signal transmitting method according to claim 17, wherein said step of outputting the first correction signal further comprises:

providing a transistor pair for receiving the comparison result and a constant voltage signal; and providing a resistor string for outputting the first correction signal via one of the nodes, wherein the resistor string is coupled to the transistor.

\* \* \* \* \*